(12) United States Patent
Nakayama et al.

(10) Patent No.: US 7,631,900 B2
(45) Date of Patent: Dec. 15, 2009

(54) PRE-TENSIONER

(75) Inventors: Tadahiro Nakayama, Hikone (JP);
Hiroshi Tomita, Omihachiman (JP);
Yoshiyuki Nakano, Hikone (JP)

(73) Assignee: Takata Corporation, Tokyo (JP)

( * ) Notice: Subject to any disclaimer, the term of this patent is extended or adjusted under 35 U.S.C. 154(b) by 226 days.

(21) Appl. No.: 11/093,048

(22) Filed: Mar. 30, 2005

(65) Prior Publication Data
US 2005/0218647 A1  Oct. 6, 2005

(30) Foreign Application Priority Data
Mar. 31, 2004 (JP) ............................. 2004-102284

(51) Int. Cl.
*B60R 22/046* (2006.01)
(52) U.S. Cl. ...................... 280/806; 297/480
(58) Field of Classification Search ................. 280/806, 280/805; 297/480
See application file for complete search history.

(56) References Cited

U.S. PATENT DOCUMENTS

| | | | | |
|---|---|---|---|---|
| 4,573,322 A | * | 3/1986 | Fohl | 60/638 |
| 4,917,210 A | * | 4/1990 | Danicek et al. | 180/268 |
| 5,284,307 A | * | 2/1994 | Kotama | 242/374 |
| 5,358,275 A | * | 10/1994 | Fohl | 280/806 |
| 5,364,129 A | * | 11/1994 | Collins et al. | 280/806 |
| 5,411,291 A | * | 5/1995 | Fohl | 280/806 |
| 5,450,723 A | * | 9/1995 | Fohl | 60/638 |
| 5,495,790 A | * | 3/1996 | Greiner | 92/85 R |
| 5,772,246 A | * | 6/1998 | Gordon | 280/806 |
| 5,887,897 A | * | 3/1999 | Gill et al. | 280/806 |
| 6,095,615 A | * | 8/2000 | Wier | 297/480 |
| 6,682,097 B2 | * | 1/2004 | Krauss et al. | 280/806 |
| 6,863,308 B2 | * | 3/2005 | Motozawa | 280/806 |
| 2002/0149191 A1 | | 10/2002 | Nishizawa | |
| 2002/0182852 A1 | | 12/2002 | Singh | |
| 2002/0185852 A1 | * | 12/2002 | Nakano et al. | 280/806 |
| 2003/0030263 A1 | * | 2/2003 | Nakano et al. | 280/806 |

FOREIGN PATENT DOCUMENTS

| | | |
|---|---|---|
| JP | 5-62363 | 8/1993 |
| JP | 3308348 | 12/1994 |
| JP | 7-223507 | 8/1995 |
| JP | 7-251707 | 10/1995 |
| JP | 8-324384 | 12/1996 |
| JP | 2003-54360 | 2/2003 |

* cited by examiner

*Primary Examiner*—Paul N. Dickosn
*Assistant Examiner*—Timothy Wilhelm
(74) *Attorney, Agent, or Firm*—Foley & Lardner LLP

(57) ABSTRACT

A pre-tensioner capable of effectively absorbing kinetic energy exerted on a coupling member connected to a piston during operation. As a gas generator is actuated to generate gas in the event of emergency, the gas is introduced into a pressure chamber. By gas pressure of the gas, a piston moves at high speed toward a taper portion of a cylinder to reach the taper portion. According to the movement of the piston, a buckle is pulled toward a bracket so that the buckle is about to reach the bottom. After that, the piston further moves to the left while deforming the taper portion. The deformation of the taper portion absorbs kinetic energy of the piston. Therefore, kinetic energy of the buckle is absorbed so as to stop the buckle softly and the impact is buffered.

9 Claims, 4 Drawing Sheets

FIG. 4(A)
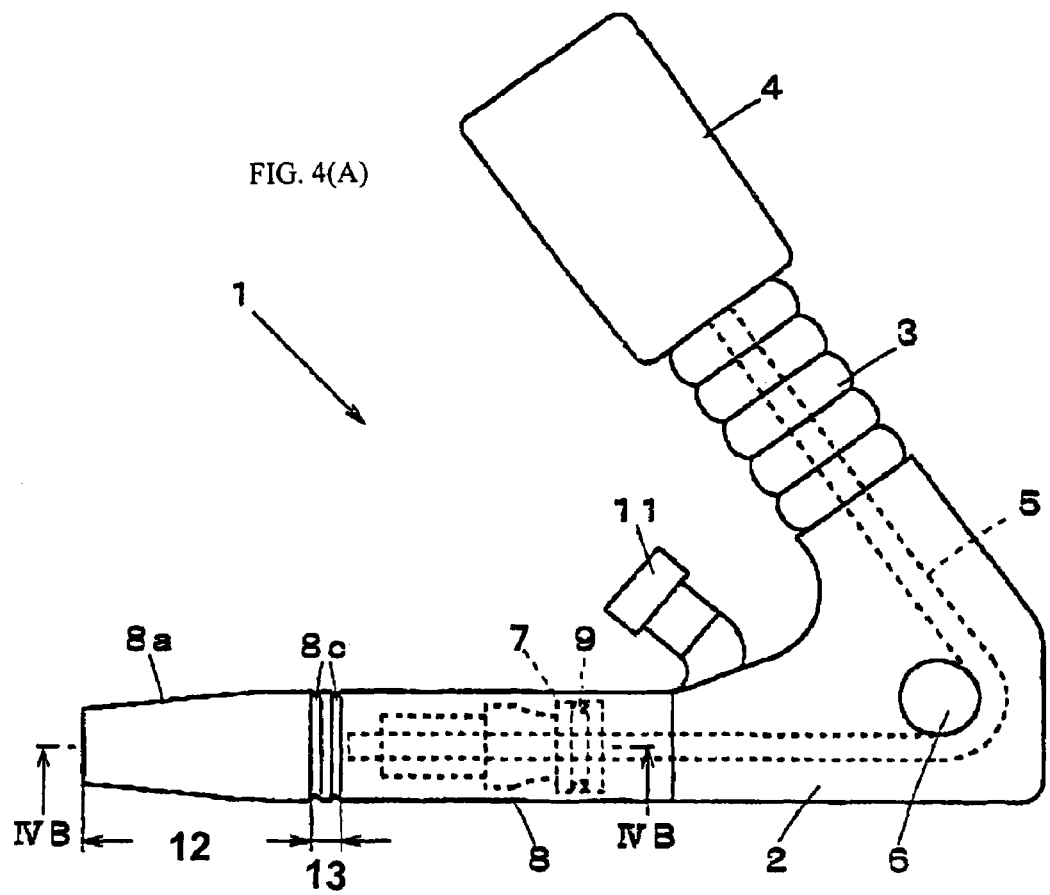
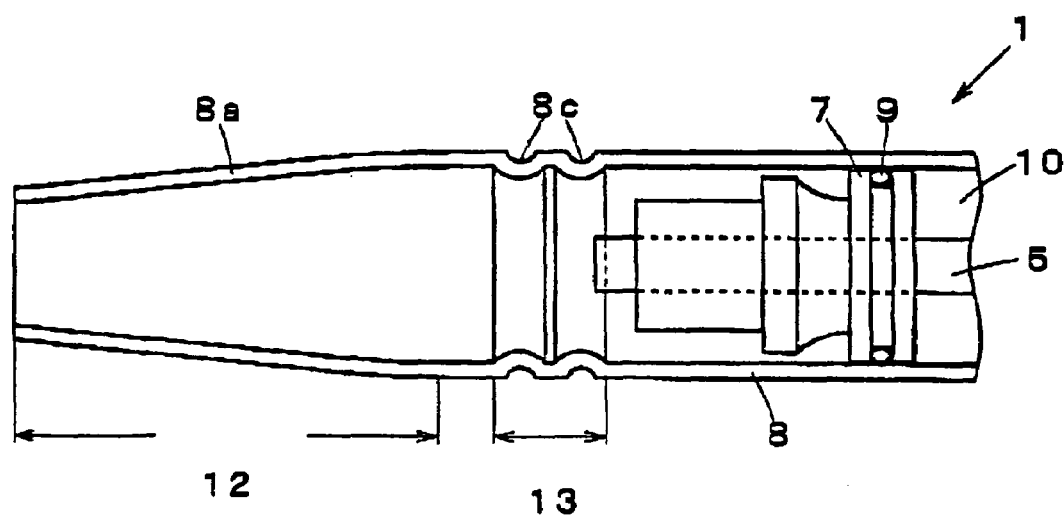
FIG. 4(B)

FIG. 5
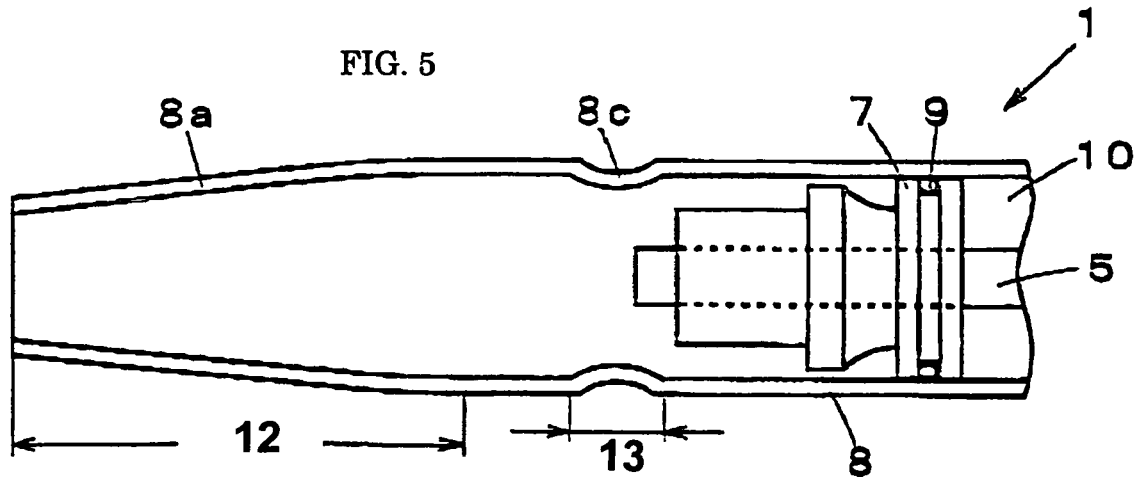
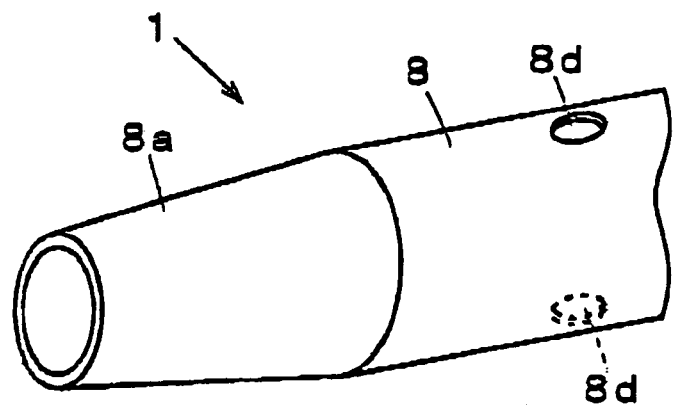
FIG. 6(A)
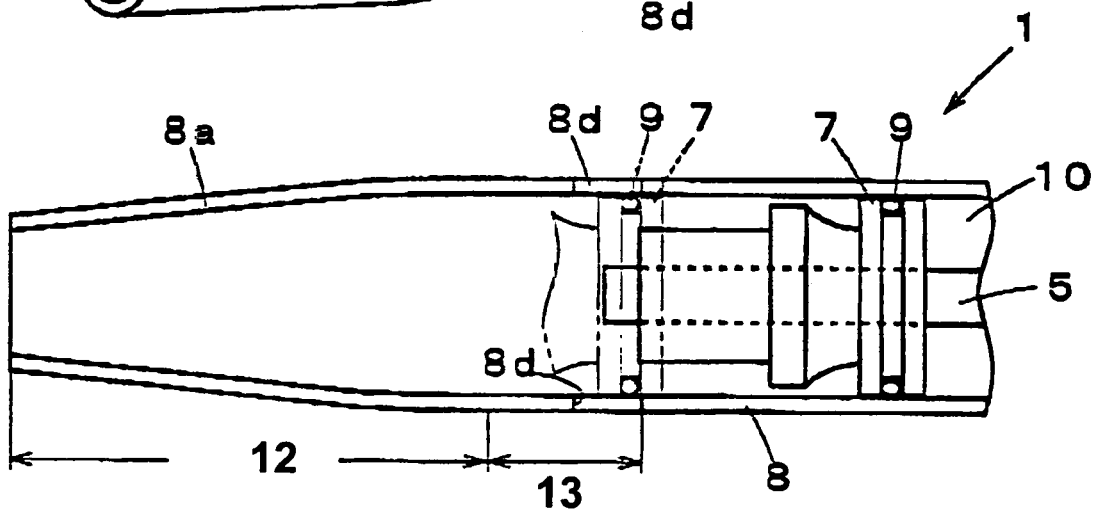
FIG. 6(B)

PRE-TENSIONER

BACKGROUND

The present invention relates to a technical field of a pre-tensioner which is used for a seat belt device installed in a seat of a vehicle such as an automobile and which is actuated to tension a seat belt so as to provide improved occupant restraint in the event of an emergency when a large deceleration is generated, such as during a vehicle collision, and more particularly to a technical field of a pre-tensioner of which a piston is moved with gas pressure of gas generated by a gas generator so as to pull a buckle or a lap anchor, thereby tensioning the seat belt.

Conventionally, vehicles such as automobiles are equipped with seat belt devices. A seat belt device is designed such that, when extremely large deceleration is generated in the event of emergency such as a vehicle collision, an occupant is restrained by a seat belt to inhibit inertia movement of the occupant, thereby protecting the occupant. Some seat belts are equipped with a pre-tensioner which tensions the seat belt in the event of emergency to increase the restraining performance so as to rapidly restrain the occupant with large restraining force. As one of conventional pre-tensioners of a type installed in a seat belt device, a pre-tensioner installed on a buckle side, i.e. a buckle pre-tensioner has been proposed such as, for example, Japanese Patent No. 2507231 (incorporated by reference herein in its entirety).

A pre-tensioner used for a seat belt device disclosed in Japanese Patent No. 2507231 comprises a piston which is slidably and gas-tightly disposed in a cylinder and which is connected to a buckle through a wire, wherein the piston is rapidly moved within the cylinder by gas generated from a gas generator so as to pull the buckle at the event of emergency, thereby tensioning the seat belt.

In the buckle pre-tensioner disclosed in Japanese Patent No. 2507231, an end of the cylinder is a taper portion formed in a truncated cone shape. As the piston rapidly moved by action of gas pressure from the gas generator enters into the end of the cylinder when a safety belt system is not in use, the taper portion of the cylinder is deformed by the piston. Deformation of the taper portion decelerates the piston so as to prevent the piston from running out of the cylinder. That is, the taper portion functions as a piston trapping device.

By the way, in such a pre-tensioner used for a seat belt device, high moving speed of a piston is desired to rapidly tension a seat belt at the event of emergency. At the same time, it is needed to absorb kinetic energy exerted on the piston immediately after operation of the pre-tensioner.

As possible means for absorbing kinetic energy exerted on the piston, there is means using deceleration control of the piston by the structure of the pre-tensioner disclosed in Japanese Patent No. 2507231. However, the deceleration control of the piston disclosed in Japanese Patent No. 2507231 is just a means for preventing the piston from running out of the cylinder and can not effectively absorb the kinetic energy of the piston.

SUMMARY

One embodiment of the invention relates to a pre-tensioner. The pre-tensioner comprises a cylinder, a piston that is slidably disposed in the cylinder and is connected to a coupling member and a gas generator which generates gas to act on the piston. The gas generator is actuated to generate gas and the piston is moved by gas pressure of the generated gas so as to pull the coupling member. The cylinder is provided with an impact buffering zone which buffers impact exerted on the coupling member by absorbing kinetic energy of the piston during operation.

According to a second embodiment of the present invention, a seat belt system is provided. The seat belt system comprises a pre-tensioner, and a seat belt connected to the pre-tensioner. The pre-tensioner increases the tension on the seat belt in an emergency condition and the pre-tensioner includes a piston and cylinder arrangement. The cylinder is configured to deform due to movement of the piston to thereby reduce an impact force on a coupling member connecting the piston to the seat belt.

Another embodiment of the present invention relates to a pre-tensioner for a seat belt system. The pre-tensioner comprises a piston, a cylinder and a coupling member for connecting the piston to the seat belt. The cylinder is configured to be deformed by movement of the piston in an emergency condition to thereby absorb kinetic energy of the piston.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1(a) and 1(b) schematically show a first embodiment of a pre-tensioner, wherein FIG. 1(a) is a front view and FIG. 1(b) is a partial sectional view taken along a line IB-IB in FIG. 1(a).

FIGS. 3(a) and 3(b) show a third embodiment of the present invention, wherein FIG. 3(b) is similar to FIG. 1(b).

FIGS. 4(a) and 4(b) schematically show a fourth embodiment of a pre-tensioner, wherein FIG. 4(a) is a front view and FIG. 4(b) is a partial sectional view taken along a line IVB-IVB in FIG. 4(a).

FIG. 5 is a partial sectional view similar to FIG. 4(b), but showing a fifth embodiment of the present invention.

FIGS. 6(a) and 6(b) are similar to FIGS. 3(a) and 3(b), respectively, but showing a sixth embodiment of the present invention.

DETAILED DESCRIPTION

Figure 1A:
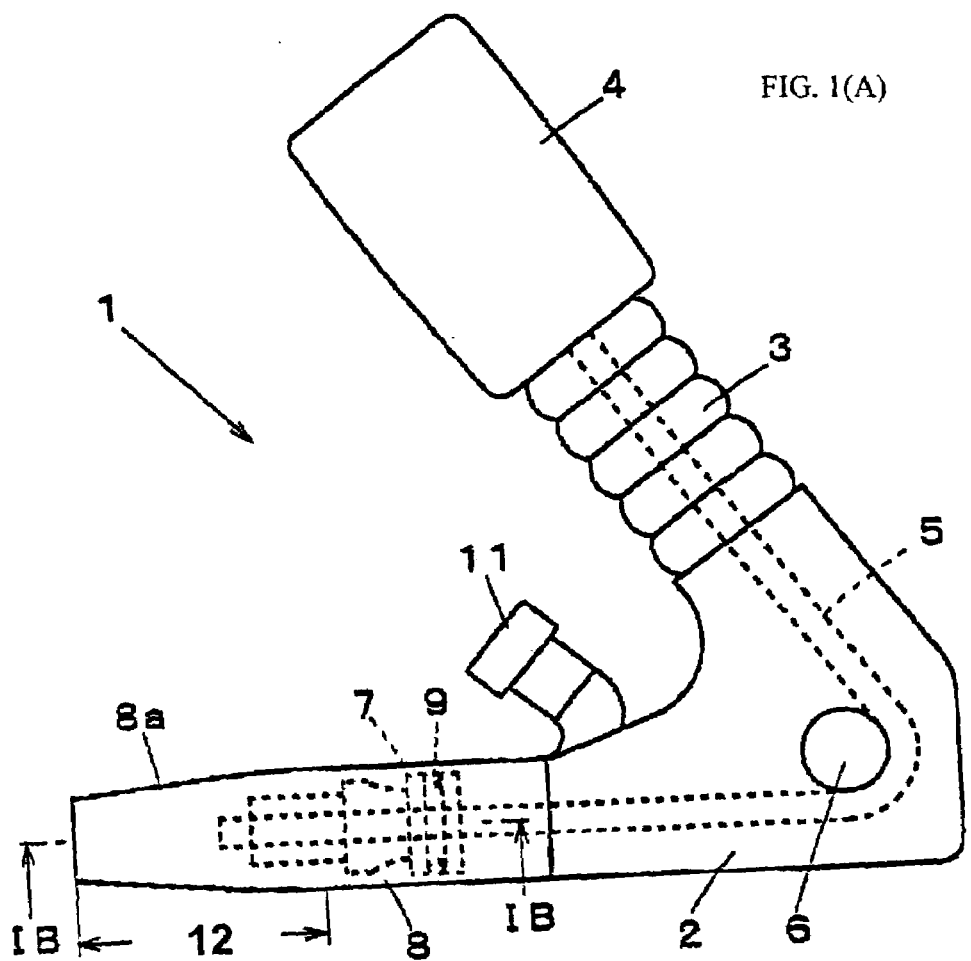

The present invention was made under the aforementioned circumstances and the object of the present invention is to provide a pre-tensioner capable of effectively absorbing kinetic energy exerted on a coupling member to be connected to a piston during operation.

To solve the aforementioned problems, a pre-tensioner according to an embodiment of the present invention comprises at least: a cylinder; a piston which is slidably disposed in said cylinder and is connected to a coupling member; and a gas generator which generates gas to act on said piston, wherein said gas generator is actuated to generate gas in the event of emergency such as a vehicle collision and said piston is moved by gas pressure of the generated gas so as to pull said coupling member, thereby providing improved occupant restraint by a seat belt, and is characterized in that said cylinder is provided with an impact buffering zone which buffers impact exerted on said coupling member by absorbing kinetic energy of said piston during operation.

A pre-tensioner of another embodiment is characterized in that said impact buffering zone is deformed by movement of said piston so as to buffer the impact on said coupling member.

A pre-tensioner of another embodiment is characterized in that the length of said impact buffering zone is set to the range of from 15 mm to 100 mm.

A pre-tensioner of another embodiment is characterized in that said cylinder is provided with a pre-decelerating zone for decelerating said piston which is positioned on the piston side than said impact buffering zone, wherein said pre-decelerating zone decelerates said piston moving toward said impact buffering zone before the impact buffering by deformation of said impact buffering zone is started.

A pre-tensioner of another embodiment is characterized in that said pre-decelerating zone is deformed by movement of said piston, thereby decelerating said piston.

A pre-tensioner according to another embodiment is characterized in that said pre-decelerating zone discharges a part of gas acting on said piston outside said cylinder, thereby decelerating said piston.

According to the pre-tensioner of any one of the above embodiments having the aforementioned structure, the kinetic energy of the piston is absorbed by the impact buffering zone provided in the cylinder during operation, thereby effectively absorbing kinetic energy exerted on the coupling member.

Especially according to the pre-tensioner of an embodiment, the impact buffering zone is deformed by the movement of the piston so that the kinetic energy of the coupling member can be effectively absorbed with a simple structure.

According to the pre-tensioner of an embodiment, the length of the impact buffering zone is set to 15 mm or more, thereby ensuring at least the minimum impact absorbing ability, and the length of the impact buffering zone is set to 100 mm or less, thereby ensuring such a suitable length thereof as to prevent the impact buffering zone from disturbing the occupant's access to the vehicle.

In another embodiment, the pre-decelerating zone is provided, thereby shortening the length of the impact buffering zone and/or reducing the thickness of the impact buffering zone, and thus reducing the weight of the pre-tensioner. In addition, since the impact buffering by deformation of the impact buffering zone is conducted after the speed of the piston is previously decelerated, the impact exerted on the coupling member can be effectively buffered.

According to another embodiment, the pre-decelerating zone is deformed by the movement of the piston, whereby the piston can be decelerated with a simple structure.

According to another embodiment, a part of gas acting on the piston is discharged through the holes formed in the cylinder, whereby the piston can be securely decelerated with a simple structure.

Hereinafter, best modes for carrying out the present invention will be described with reference to the attached drawings.

Figure 1B:
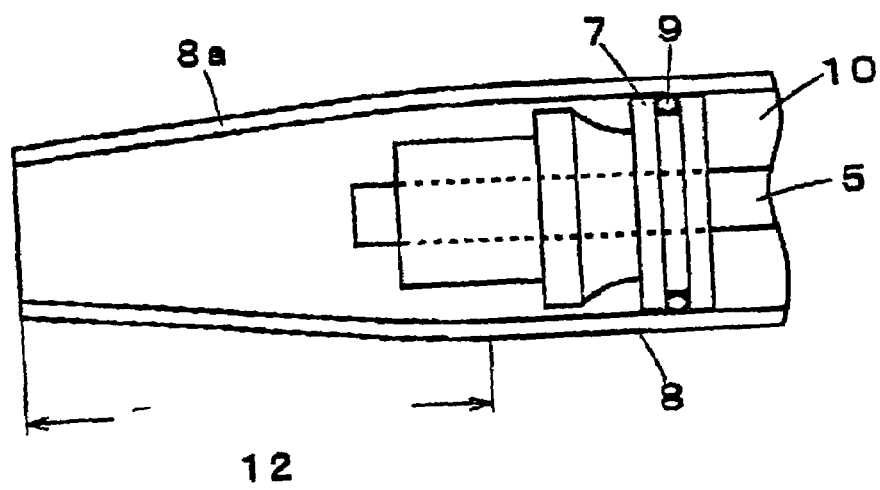

FIGS. 1(a) and 1(b) schematically show a first embodiment of a pre-tensioner according to the present invention, wherein FIG. 1(a) is a front view and FIG. 1(b) is a sectional view taken along a line IB-IB in FIG. 1(a).

As shown in FIGS. 1(a) and 1(b), a pre-tensioner 1 of this first embodiment is a buckle pre-tensioner comprising a cover 3 which can expand and contract in the axial direction. One end of the cover 3 is attached to a bracket 2 and the other end of the cover 3 is attached to a well-known buckle (corresponding to the coupling member of the present invention) 4. The buckle 4 is provided at its upper end with a tongue insertion opening (not shown) and has a lower portion (the side opposite to the upper end) to which an end of a wire 5 is connected. The wire 5 extends such that the other end thereof is connected to a piston 7 after being wound on a pulley 6 which is rotatably fixed to the bracket 2.

The piston 7 is housed in a cylinder 8 attached to the bracket 2 such that the piston 7 is arranged slidably and gas-tightly by a sealing member 9 such as an O-ring. The end of the cylinder 8 (the side opposite to the side mounted to the bracket 2) is formed to be a taper portion 8a of a truncated cone shape with the cylinder diameter continuously decreasing toward the end of the cylinder 8. The cylinder is provided with a pressure chamber 10 formed therein at the side opposite to the taper portion 8a about the piston 7. The pressure chamber 10 is in communication with a gas generator 11 mounted to the bracket 2. The gas generator 11 is actuated at the event of emergency to react reacting substance, thereby generating high-pressure reaction gas. The gas thus generated is introduced into the pressure chamber 10. The reaction gas introduced into the pressure chamber 10 acts on the piston 7 whereby the piston 7 moves toward the end of the cylinder 8 so as to pull the buckle 4 toward the bracket 2 via the wire 5. As the piston 7 moves and reaches the taper portion 8a, the piston 7 plastically deforms the taper portion 8a. The deformation of the taper portion 8a absorbs kinetic energy of the piston 7.

By the way, when the buckle 4 is pulled toward the bracket 2 from the normal state shown in FIG. 1(a), the buckle 4 may be pulled fully to reach the bottom so that the cover 3 is maximally contracted, that is, the cover 3 can not be contracted more. If the buckle 4 reaches the bottom, the cover 3 is clamped between the bracket 2 and the buckle 4 which are relatively rigid members so that impact may be exerted on the buckle 4 and the cover 3 and buckle 4 may rapidly stop. During this, the contractable cover 3 of a concertina shape buffers the impact. However, it is still desired to improve the impact buffering capability and to stop the buckle softly.

In the pre-tensioner 1 of the first embodiment, the relative positional relation between the buckle 4 and the piston 7 is designed such that the kinetic energy of the piston 7 is absorbed by the deformation of the taper portion 8a when the buckle 4 is about to reach the bottom. That is, the piston 7 continues to move while deforming the taper portion 8a, whereby the buckle 4 is softly stopped and the impact is buffered. Therefore, the taper portion 8a of the cylinder 8 functions as an impact buffering zone 12.

In the pre-tensioner of the first embodiment having the aforementioned structure, as the gas generator 11 is actuated to generate gas in the event of emergency in a state that an occupant wears the seat belt (not shown) with a tongue (not shown) being latched to the buckle 4, the gas is introduced into the pressure chamber 10. Then, the piston 7 rapidly moves to the taper portion 8a (to the left in FIG. 1(a)) toward the end of the cylinder 8 because of gas pressure of the gas and reaches the taper portion 8a of the cylinder 8. By the movement of the piston 7, the buckle 4 is pulled toward the bracket 2 and is about to reach the bottom. After that, the piston 7 further moves to the left while deforming the taper portion 8a. The deformation of the taper portion 8a absorbs kinetic energy of the piston 7. Therefore, the buckle 4 is softly stopped and the impact is buffered.

In this relation, the length of the taper portion 8a as the impact buffering zone is set to the range of from 15 mm to 100 mm. This length range ensures at least the minimum impact absorbing ability and ensures such a suitable length of the taper portion 8a as to prevent the taper portion 8a from disturbing the occupant's access to the vehicle.

According to the pre-tensioner 1 of the first embodiment, the kinetic energy of the piston 7 moving at high speed during operation can be absorbed just before the buckle 4 reaches the bottom so that the kinetic energy of the buckle 4 can be effectively absorbed. During this the taper 8a as the impact buffering zone 12 is deformed according to the movement of the piston 7. Therefore, the kinetic energy of the buckle 4 can be effectively absorbed with a simple structure and the impact can be buffered.

Figure 2:
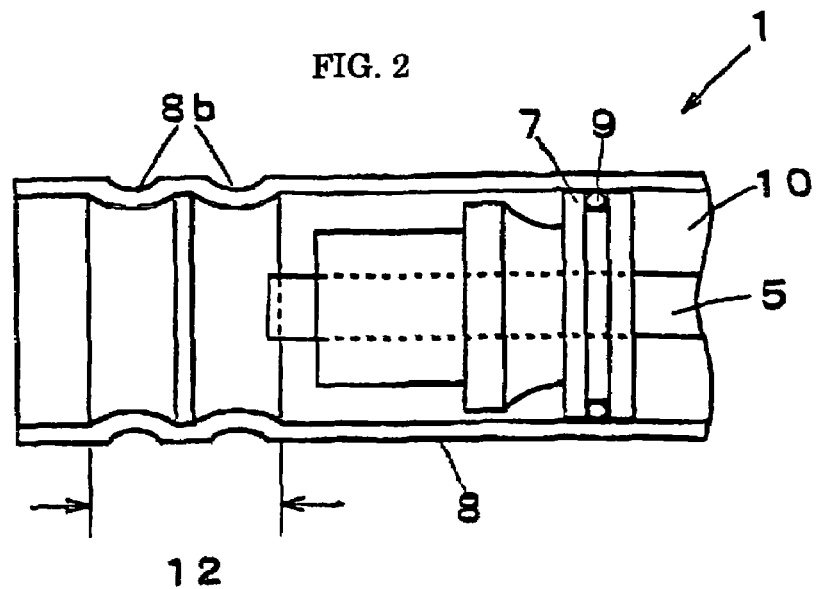
FIG. 2 is a partial sectional view similar to FIG. 1(b), but showing a second embodiment of the present invention.

FIG. 2 is a partially sectional view similar to FIG. 1(b), but showing a second embodiment of the present invention. It should be noted that, in the following description of the respective embodiments, the same components as the components used in the former embodiment are marked with the same numerals so as to omit the detail description about such components.

As shown in FIG. 2, the pre-tensioner 1 of the second embodiment is provided with a predetermined number (one or more: two in the illustrated example) of annular concavities 8b each having an arc shape in longitudinal section instead of the taper portion 8a of the aforementioned first embodiment. The concavities 8b are formed to have a plurality of rows in the longitudinal direction of the cylinder at an end portion of the cylinder 8. The predetermined number of annular concavities 8b are deformed sequentially from the one nearest to the piston 7 by the piston 7 moving at high speed in the event of emergency as mentioned above at a position just before the buckle 4 reaches the bottom, whereby kinetic energy of the piston 7 is absorbed by the predetermined number of concavities. Because of the absorption of the kinetic energy of the piston 7 by the predetermined number of concavities, kinetic energy of the buckle 4 is absorbed so as to stop the buckle 4 softly and the impact is buffered.

In case that a plurality of annular concavities 8b are formed to have a plurality of rows in the longitudinal direction of the cylinder 8, the specs (width (length in the longitudinal direction of the cylinder 8), depth (dent amount in the radial direction of the cylinder), curvature radius, and the like) of the respective concavities may be designed to be identical with each other or designed to be different from each other. Alternatively, the specs of some concavities 8b may be designed to be identical with each other while the specs of the other concavities 8b may be designed to be identical with each other so that the spec of the former concavities 8b and the spec of the latter concavities 8b are different from each other.

The other structure and other works and effects of the pre-tensioner 1 of the second embodiment are the same as those of the first embodiment.

Figure 3A:
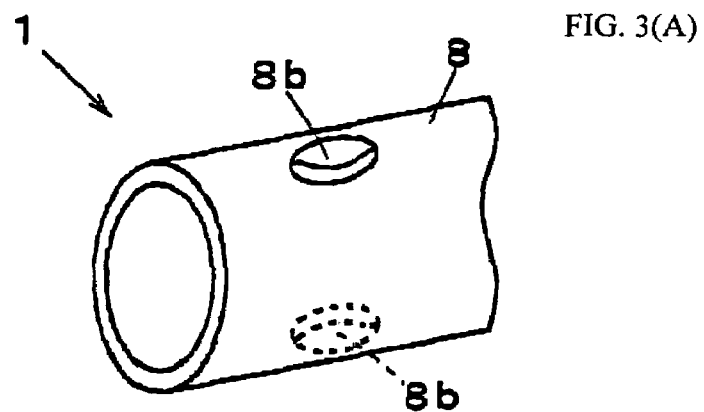
Figure 3B:
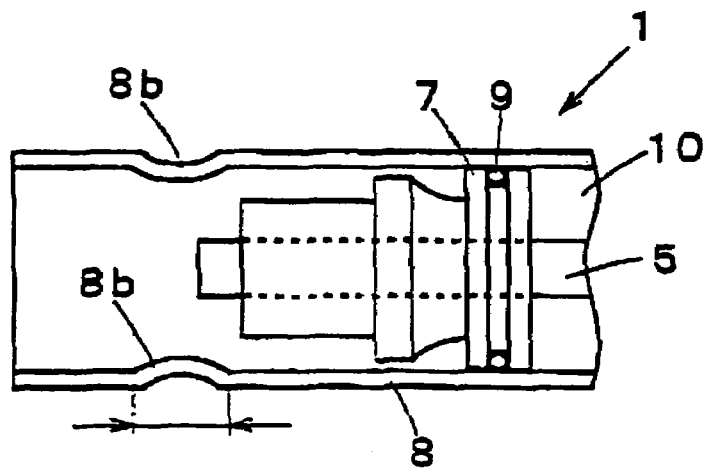

FIGS. 3(a) and 3(b) show a third embodiment of the present invention, wherein FIG. 3(b) is similar to FIG. 1(b).

Though the concavities 8b each having an arc shape in longitudinal section are annular in the aforementioned second embodiment, a predetermined number of punctate concavities 8b each having an arc shape in longitudinal section are formed at an end portion of a cylinder 8 in a pre-tensioner 1 of the third embodiment as shown in FIGS. 3(a) and 3(b). The number of the concavities 8b is one or more. In case that a plurality of (two in the illustrated example) concavities are formed, it is preferable from the viewpoint of balance that the concavities 8b are formed at even intervals in the circumferential direction of the cylinder 8. Though the predetermined number of concavities 8b are formed to have a single row in the longitudinal direction of the cylinder 8 in the illustrated example, the concavities 8b may be formed to have a plurality of rows in the longitudinal direction of the cylinder 8. In case of the plurality of rows, the specs (width (length in the longitudinal direction of the cylinder 8 and length in the circumferential direction of the cylinder 8), depth (dent amount in the radial direction of the cylinder), curvature radii in longitudinal section and cross section of the cylinder 8, and the like) of the concavities 8b in each row may be designed to be identical with or different from the concavities 8b in another row. Alternatively, the specs of the concavities 8b in some rows may be designed to be identical with each other while the specs of the concavities 8b in other rows may be designed to be identical with each other so that the spec of the concavities 8b in the former rows and the spec of the concavities 8b in the latter rows are different from each other.

According to the pre-tensioner 1 of the third embodiment, the absorption of kinetic energy of the piston 7 can be controlled sensitively.

The other structure and other works and effects of the pre-tensioner 1 of the third embodiment are the same as those of the second embodiment.

FIGS. 4(a) and 4(b) are similar to FIGS. 1(a) and 1(b), but showing a fourth embodiment of the present invention.

As shown in FIGS. 4(a) and 4(b), a pre-tensioner 1 of the fourth embodiment is the same as the pre-tensioner 1 of the aforementioned first embodiment except that a pre-decelerating zone 13 is positioned upstream of an impact buffering zone 12 consisting of a taper portion 8a formed at an end of a cylinder 8 (at a piston 7 side of the taper portion 8a). The pre-decelerating zone 13 comprises a predetermined number of annular concavities 8c each having an arc shape in longitudinal section wherein the concavities 8c are formed to have a plurality of rows like the concavities 8b of the aforementioned second embodiment.

The position where the concavities 8c are formed is set such that, when the piston 7 moves and comes in contact with one of the concavities 8c, the buckle 4 will be positioned on the pulling way to the bracket 2 before the position that the buckle 4 is about to reach the bottom. The arrangement of the concavities 8c in the longitudinal direction of the cylinder 8 and the specs of the concavities 8c are set substantially the same as those of the concavities 8b of the second embodiment.

In the pre-tensioner 1 of the fourth embodiment, the predetermined number of concavities 8c are deformed sequentially from the one nearest to the piston 7 by the piston 7 moving at high speed in the event of emergency on the pulling way before the position that the buckle 4 is about to reach the bottom, whereby the moving speed of the piston 7 is previously decelerated. The decelerated piston 7 comes in contact with the taper portion 8a as the impact buffering zone 12 to deform the taper portion 8a similarly to the aforementioned first embodiment, whereby kinetic energy of the piston 7 is absorbed, kinetic energy of the buckle 4 is thus absorbed so as to stop the buckle 4 softly and the impact is buffered. In this case, since the impact buffering by the impact buffering zone 12 is conducted after the speed of the piston 7 is previously decelerated, the impact exerted on the buckle 4 can be more effectively buffered. In this case, since the concavities 8c as the pre-decelerating zone 13 are deformed by the movement of the piston 7, the deceleration of the piston 7 is achieved by a simple structure.

According to the pre-tensioner 1 of the fourth embodiment, the pre-decelerating zone 13 is provided, thereby shortening the length of the impact buffering zone 12 or reducing the thickness of the impact buffering zone 12, and thus reducing the weight of the pre-tensioner. In addition, since the kinetic energy absorption by deformation of the impact buffering zone 12 is conducted after the speed of the piston 7 is previously decelerated, the kinetic energy exerted on the buckle 4 can be effectively absorbed so that the impact can be effectively buffered.

The other structure and other works and effects of the pre-tensioner 1 of the fourth embodiment are the same as those of the first embodiment.

FIG. 5 is similar to FIG. 4(b), but showing a fifth embodiment of the present invention.

Though the pre-decelerating zone 13 positioned upstream of the impact buffering zone 12 comprising the taper portion 8a is composed of the annular concavities 8c in the aforementioned fourth embodiment, a pre-decelerating zone 13 positioned upstream of an impact buffering zone 12 comprising a taper portion 8a is composed of punctate concavities 8c like the punctate concavities 8b of the third embodiment in a pre-tensioner of the fifth embodiment shown in FIG. 5. The arrangement of the punctate concavities 8c in the longitudinal direction, the arrangement of the punctate concavities 8c in the circumferential direction of the cylinder 8, and the specs of the punctate concavities 8c are set substantially the same as those of the concavities 8b of the third embodiment. According to the pre-tensioner 1 of the fifth embodiment, the pre-deceleration of the piston 7 can be controlled more sensitively.

The other structure and other works and effects of the pre-tensioner 1 of the fifth embodiment are the same as those of the fourth embodiment.

FIGS. 6(a) and 6(b) are similar to FIGS. 3(a) and 3(b), respectively, but showing a sixth embodiment of the present invention.

Though the pre-decelerating zone 13 positioned upstream of the impact buffering zone 12 comprising the taper portion 8a is composed of the punctate concavities 8c in the aforementioned fifth embodiment, a pre-decelerating zone 13 positioned upstream of an impact buffering zone 12 comprising a taper portion 8a is composed of a predetermined number of punctate holes 8d formed in the cylinder 8 in a pre-tensioner 1 of the sixth embodiment shown in FIGS. 6(a) and 6(b). The arrangement of the holes 8d in the longitudinal direction of the cylinder 8, the arrangement of the holes 8d in the circumferential direction of the cylinder 8, and the specs of the holes 8d are set substantially the same as those of the concavities 8b of the third embodiment (except the depth of the concavities 8c because the holes 8d are holes).

In the pre-tensioner 1 of the sixth embodiment, as a seal member 9 of the piston 7 moving at high speed in the event of emergency starts to pass the holes 8d, a part of gas introduced in the pressure chamber 10 is flowed out (discharged) through the holes 8d. Accordingly, the pressure inside the pressure chamber 10 is reduced, whereby the speed of the piston 7 is decelerated.

Since the pre-tensioner 1 is designed such that a part of gas acting on the piston 7 is discharged through the holes 8d formed in the cylinder 8, the piston 7 can be securely decelerated with a simple structure.

The other structure and other works and effects of the pre-tensioner 1 of the sixth embodiment are the same as those of the fifth embodiment.

Though the pre-tensioner of the present invention has been described as a pre-tensioner for a buckle 4 in any of the aforementioned embodiments, the pre-tensioner of the present invention can be adopted as a pre-tensioner for a lap anchor.

The pre-tensioner of the present invention is a pre-tensioner which is employed for a seat belt device installed in a seat of a vehicle such as automobile and which is actuated in the event of emergency such as a vehicle collision to tension a seat belt so as to provide improved occupant restraint, and is thus suitably used as a pre-tensioner of a type that a piston is moved by gas pressure of gas generated from a gas generator so as to pull a buckle or a lap anchor, thereby tensioning the seat belt.

The priority application, Japanese Patent Application No. 2004-102284, filed Mar. 31, 2004, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pre-tensioner comprising:
a cylinder;
a piston that is slidably disposed in the cylinder and is connected to a coupling member;
a cover that is coupled to the coupling member and is contractable to a fully contracted position; and
a gas generator which generates gas to act on the piston,
wherein the gas generator is actuated to generate gas and the piston is moved by gas pressure of the generated gas so as to pull the coupling member so that the coupling member contracts the cover toward the fully contracted position,
wherein the cylinder is provided with an impact buffering zone which buffers impact exerted on the coupling member by absorbing kinetic energy of the piston during operation, the impact buffering zone being a tapered portion of the cylinder in which the piston slides through, the impact buffering zone of the cylinder being deformed by movement of the piston so as to buffer the impact on the coupling member,
wherein the cylinder is provided with a pre-decelerating zone for decelerating the piston, the pre-decelerating zone comprising annular concavities separated a distance from the tapered portion of the impact buffering zone, and
wherein the piston is configured to deform at least a portion of the impact buffering zone prior to the cover reaching the fully contracted position.

2. The pre-tensioner according to claim 1, wherein the pre-decelerating zone is located between the piston and the impact buffering zone, wherein the pre-decelerating zone decelerates the piston before the deformation of the impact buffering zone starts.

3. The pre-tensioner according to claim 2, wherein the pre-decelerating zone of the cylinder is configured to be deformed by movement of the piston, thereby decelerating the piston.

4. The pre-tensioner according to claim 2, wherein the pre-decelerating zone of the cylinder includes a mechanism for discharging a portion of the gas acting on the piston, thereby decelerating the piston.

5. A seat belt system, comprising:
a pre-tensioner; and
a seat belt connected to the pre-tensioner,
wherein the pre-tensioner increases the tension on the seat belt in an emergency condition,
wherein the pre-tensioner includes a piston and cylinder arrangement, wherein the cylinder is configured to deform in a deformation portion due to movement of the piston to thereby reduce an impact force on a coupling member connecting the piston to the seat belt, the deformation portion of the cylinder being configured as a tapered portion of the cylinder, wherein the cylinder includes a pre-decelerating zone configured to decelerate the piston, the entire pre-decelerating zone being separated from and positioned before the deformation portion, and the pre-decelerating zone being configured to deform by movement of the piston, wherein the pre-decelerating zone includes annular concavities, and wherein the pre-decelerating zone decelerates the piston before deformation of the cylinder starts.

6. The seat belt system according to claim 5, wherein a length of a deforming section of the cylinder is in the range of 15 mm to 100 mm.

7. A pre-tensioner for a seat belt system, comprising:
a piston;
a cylinder;
a cover that is contractable to a fully contracted position; and a coupling member for connecting the piston to the seat belt and configured to contract the cover toward the fully contracted position upon movement of the piston, wherein the cylinder is configured to be deformed in a deforming section by movement of the piston in an emergency condition to thereby absorb kinetic energy of the piston, the impact buffering zone being a tapered portion of the cylinder in which the piston slides through, wherein the piston is configured to deform at least a portion of the cylinder prior to the cover reaching the fully contracted position, and wherein the cylinder includes a pre-decelerating zone configured to decelerate the piston, the pre-decelerating zone including annular concavities.

8. The pre-tensioner according to claim 7, wherein the pre-decelerating zone is separated from the deforming section of the cylinder and located between the piston and a deforming section of the cylinder.

9. The pre-tensioner according to claim 7, wherein the pre-decelerating zone decelerates the piston before deformation of the cylinder starts.

* * * * *